(12) United States Patent
Jochman et al.

(10) Patent No.: US 12,350,765 B2
(45) Date of Patent: Jul. 8, 2025

(54) ENGINE-DRIVEN POWER SYSTEMS AND METHODS FOR AUTOMATIC ENGINE STARTING

(71) Applicant: Illinois Tool Works Inc., Glenview, IL (US)

(72) Inventors: Nathan Joe Jochman, Menasha, WI (US); Joseph C. Schneider, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1003 days.

(21) Appl. No.: 16/985,703

(22) Filed: Aug. 5, 2020

(65) Prior Publication Data

US 2022/0040779 A1    Feb. 10, 2022

(51) Int. Cl.
 *B23K 9/095* (2006.01)
 *B23K 9/10* (2006.01)

(52) U.S. Cl.
 CPC .......... *B23K 9/1043* (2013.01); *B23K 9/0953* (2013.01); *B23K 9/0956* (2013.01); *B23K 9/1087* (2013.01)

(58) Field of Classification Search
 CPC .. B23K 9/1043; B23K 9/0953; B23K 9/0956; B23K 9/1087
 See application file for complete search history.

(56) References Cited

U.S. PATENT DOCUMENTS

| | | |
|---|---|---|
| 2,170,861 A | 8/1939 | Hobart |
| 2,237,894 A | 4/1941 | Tyrner |
| 2,412,745 A | 12/1946 | Packard |
| 2,427,127 A | 9/1947 | Dysart |
| 2,499,635 A | 3/1950 | Ferguson |
| 3,748,561 A | 7/1973 | Williams |
| 4,079,231 A | 3/1978 | Toth |
| 6,034,350 A * | 3/2000 | Heraly ............ B23K 9/1056 219/130.31 |
| 6,040,555 A | 3/2000 | Tiller |
| 6,570,131 B1 | 5/2003 | Stava |
| 6,603,097 B2 | 8/2003 | Leisner |
| 6,982,398 B2 * | 1/2006 | Albrecht .......... B23K 9/1062 219/130.21 |
| 8,987,638 B2 | 3/2015 | Hiroi et al. |
| 9,206,780 B2 | 12/2015 | Renner |
| 9,943,924 B2 | 4/2018 | Denis |
| 10,071,435 B2 | 9/2018 | Enyedy et al. |
| 10,201,869 B2 | 2/2019 | Enyedy et al. |
| 10,279,414 B2 | 5/2019 | Enyedy et al. |

(Continued)

OTHER PUBLICATIONS

Jeff Grill, What is Scratch Start TIG? How & When to Use It, 2022, https://weldguru.com/, p. 1 (Year: 2022).*

*Primary Examiner* — Tiffany T Tran
(74) *Attorney, Agent, or Firm* — McAndrews, Held & Malloy, Ltd.

(57) ABSTRACT

An example engine-driven welding-type power supply includes: an engine; a generator configured to convert mechanical power from the engine to electrical power; power conversion circuitry to convert the electrical power to welding power and to output the welding power via output terminals; and control circuitry configured to, while the engine is stopped, automatically start the engine in response to detecting a welding circuit scratch via the output terminals.

17 Claims, 3 Drawing Sheets

(56) References Cited

U.S. PATENT DOCUMENTS

| | | | |
|---|---|---|---|
| 2006/0086696 A1* | 4/2006 | Ulrich | B23K 9/205 |
| | | | 219/98 |
| 2008/0308540 A1 | 12/2008 | Hiroi et al. | |
| 2015/0273610 A1* | 10/2015 | Denis | B23K 9/1087 |
| | | | 219/132 |
| 2017/0046975 A1* | 2/2017 | Becker | B23K 9/287 |
| 2017/0072497 A1* | 3/2017 | Ivkovich | B23K 9/09 |
| 2019/0099769 A1* | 4/2019 | Holverson | B05B 12/18 |
| 2019/0240762 A1 | 8/2019 | Ihde | |

* cited by examiner

ENGINE-DRIVEN POWER SYSTEMS AND METHODS FOR AUTOMATIC ENGINE
STARTING

BACKGROUND

This disclosure relates generally to welding systems and, more particularly, to engine-driven power systems and methods for automatic engine starting.

Engine-driven power systems provide power based on a desired load. When there is no or low load on the engine, the engine controller may reduce the engine speed to an idle speed or shut down the engine. In many cases, restarting the engine may involve being physically present at the engine-driven power system.

SUMMARY

Engine-driven power systems and methods for automatic engine starting are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to identify similar or identical components.

DETAILED DESCRIPTION

Figure 1:
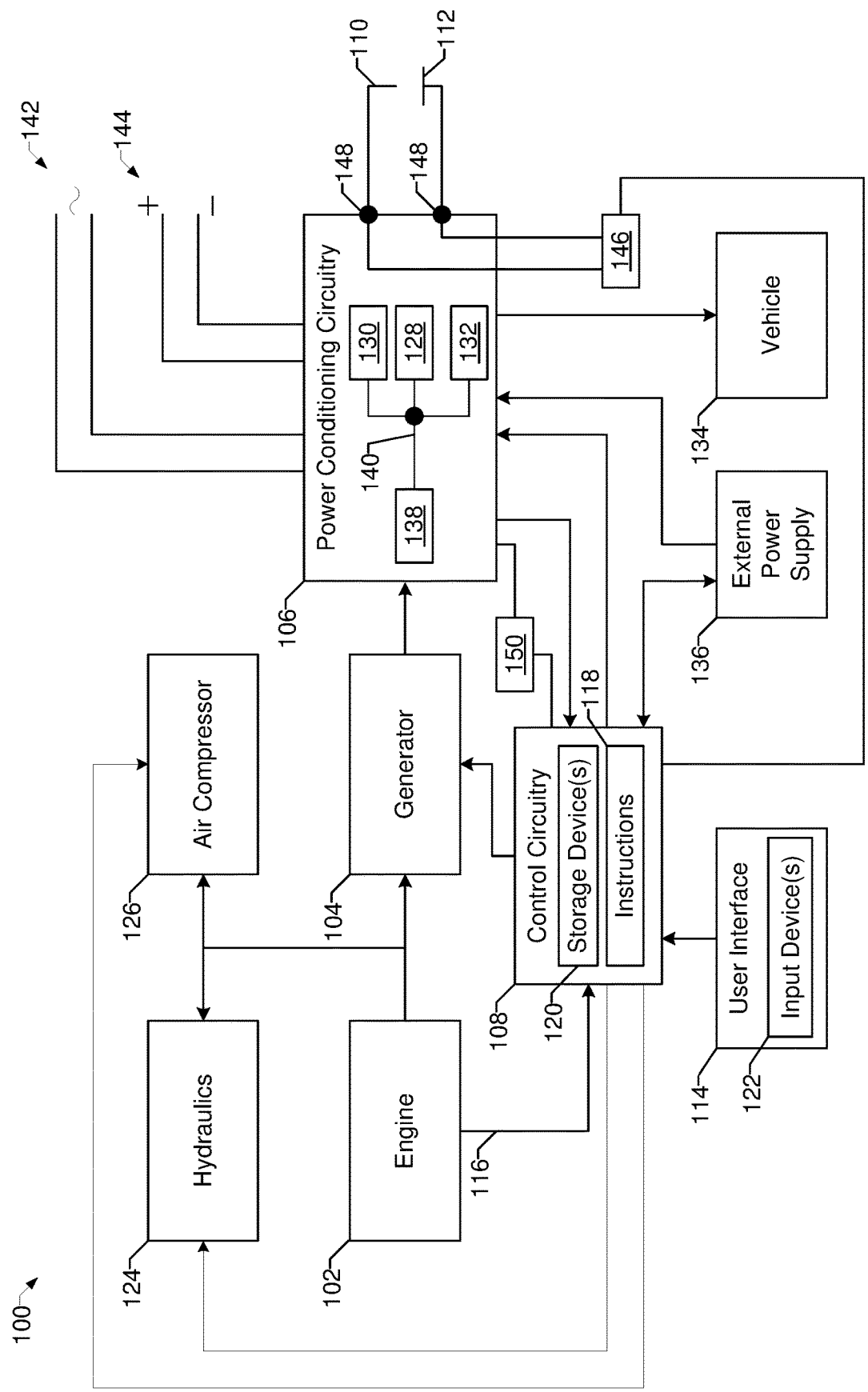
FIG. 1 is a schematic diagram of an example engine-driven power systems including a user interface for configuring load management prioritization, in accordance with aspects of this disclosure.

Conventional engine-driven power systems may include automatic stop and automatic starting features. Conventional engine-driven power systems attempt to provide the operator with a method to start the engine, in certain circumstances, without being physically located at the engine-drive power system. In particular, conventional engine-driven power systems start the engine after detecting two contacts between a welding electrode and a workpiece. Other conventional engine-driven power systems start the engine after detecting a single contact between a welding electrode an a workpiece. These conventional systems run the risk that the electrode or the electrode holder may accidentally make contact with the workpiece, causing the engine to start unexpectedly.

Disclosed example engine-driven power systems and methods enable the operator to start the engine from a location that is remote from the engine-driven power system, and reduce the risk of unintentional starts of the engine. In some examples, the engine-driven power system enables an operator to use a shielded metal arc welding (SMAW, also referred to as stick welding) electrode, and/or another type of electrode to produce a signal that can be detected at the machine to start the engine. Accordingly, disclosed examples reduce the need for the operator to walk back to the engine-driven power system to start the engine before welding, which reduces fuel consumption, wear and tear on the power system, and/or undesirable sound.

In some disclosed examples, control circuitry of an engine-driven power system automatically starts the engine of the engine-driven power system when the operator creates a rapid, intermittent signal between the stick electrode and the workpiece using a scratching technique that is a common way to start stick welding. In response to detecting the scratch, the control circuitry starts the engine because the operator may be completely ready for welding, such as by holding the electrode in the operator's hand with welding-appropriate personal protective equipment (PPE) in place.

In some examples, the control circuitry recognizes the scratch by monitoring a signal at the output terminals connected to the workpiece and the welding electrode. The control circuitry may filter the signal, such as by producing a running average, and comparing the filtered signal to a target (e.g., intermediate) voltage or current range. In some examples, the target zone may be predetermined to have higher impedance, higher voltage, and/or lower current than the impedance, voltage, and/or current when the electrode is in contact with the workpiece. Additionally or alternatively, the target zone may be predetermined to have lower impedance, lower voltage, and/or higher current than the impedance, voltage, and/or current when the electrode is in not in contact with the workpiece (e.g., an open welding circuit).

If the filtered signal is within the target zone (e.g., not open and not shorted), the control circuitry may monitor the duration of the signal within the target zone. When the duration exceeds a limit (e.g., a fixed or adjustable limit), the control circuitry responds by starting the engine to provide the mechanical and electrical power required for the welding operation.

If a short circuit signal is detected (e.g., a lower voltage than an target zone lower voltage limit, a higher current than an target zone upper current limit, etc.), the control circuitry does not start the engine. For example, a short-circuited electrode can occur if the stinger or stick electrode are dropped and left in contact with the work piece. Because an intermediate zone signal is more difficult to produce accidentally, disclosed systems and methods are less prone to unintended engine starts than conventional systems that use a short circuited electrode signal.

In some examples, the control circuitry permit modification of scratch detection criteria based on the user's technique, such as based on the duration required to detect a scratch and/or limits of the target zone. Additionally or alternatively, the control circuitry may automatically modify scratch detection criteria based on analysis of repeated scratch events (e.g., average scratch duration, standard deviation of scratch duration, etc.).

The term "welding-type output," as used herein, refers to an output suitable for welding, plasma cutting, induction heating, CAC-A and/or hot wire welding/preheating (including laser welding and laser cladding).

Disclosed example engine-driven welding-type power supplies include an engine, a generator configured to convert mechanical power from the engine to electrical power, power conversion circuitry to convert the electrical power to welding power and to output the welding power via output terminals, and control circuitry configured to, while the engine is stopped, automatically start the engine in response to detecting a welding circuit scratch via the output terminals.

In some examples, the control circuitry is configured to detect the welding circuit scratch by: controlling a voltage source to apply a test voltage to the output terminals; collecting filtered samples by filtering a plurality of samples based on at least one of a voltage at the output terminals or a current at the output terminals; and in response to determining that at least a threshold number of the filtered samples are within a predetermined range, detect the welding circuit scratch. In some examples, the control circuitry is configured to filter the plurality of samples to generate the filtered samples by averaging a subset of the plurality of samples.

In some example engine-driven welding-type power supplies, the control circuitry is configured to filter the plurality of samples to generate the filtered samples by determining a running average of the plurality of samples. In some examples, a lower limit of the predetermined range is a voltage greater than a short circuit voltage. In some example engine-driven welding-type power supplies, an upper limit of the predetermined range is a voltage that is less than an output voltage of the voltage source. In some examples, a lower limit of the predetermined range is a current greater than zero. In some examples, a lower limit of the predetermined range is a current less than a current limit of the voltage source.

In some example engine-driven welding-type power supplies, the control circuitry is configured to automatically start the engine in response determining that at least a threshold number of successive ones of the filtered samples are within the predetermined range. In some example engine-driven welding-type power supplies, the control circuitry is configured to automatically start the engine in response to determining that at least a threshold number of the filtered samples are within the predetermined range over a same time period that at least a threshold percentage of the filtered samples are within the predetermined range.

In some example engine-driven welding-type power supplies, the control circuitry is configured to adjust at least one of the threshold number of the filtered samples or the predetermined range based on at least one prior detected welding circuit scratch. In some example engine-driven welding-type power supplies, the control circuitry is configured to not start the engine in response to the threshold number of the filtered samples being below the predetermined range. In some example engine-driven welding-type power supplies, the control circuitry is configured to not start the engine in response to the threshold number of the filtered samples being above the predetermined range.

In some example engine-driven welding-type power supplies, the control circuitry is configured to detect the welding circuit scratch by detecting a plurality of short circuits interspersed with a plurality of open circuits via the output terminals for at least a threshold time period. In some example engine-driven welding-type power supplies, the control circuitry is configured to detect the welding circuit scratch by: controlling a voltage source to apply a test voltage to the output terminals; and determining whether a plurality of samples are representative of the welding circuit scratch, in which the plurality of samples are based on at least one of a voltage at the output terminals or a current at the output terminals.

In some example engine-driven welding-type power supplies, the welding circuit scratch involves at least one of a welding electrode-to-workpiece scratch or a welding torch-to-workpiece scratch.

Disclosed example methods to control an engine-driven welding-type power supply involve: in response to detecting a welding circuit scratch via output terminals of a welding circuit, automatically starting an engine; converting mechanical power from the engine to electrical power; and converting the electrical power to welding power; and outputting the welding power via the output terminals.

In some example methods, detecting the welding circuit scratch involves: controlling a voltage source to apply a test voltage to the output terminals; collecting filtered samples by filtering a plurality of samples of at least one of a voltage at the output terminals or a current at the output terminals; and in response to determining that at least a threshold number of the filtered samples are within a predetermined range, automatically starting the engine. In some example methods, the welding circuit scratch involves at least one of a welding electrode-to-workpiece scratch or a welding torch-to-workpiece scratch.

FIG. 1 is a schematic diagram of an example engine-driven power system 100 implementing output reduction. The example engine-driven power system 100 includes an engine 102, a generator 104, power conditioning circuitry 106, and control circuitry 108.

The engine 102 is mechanically coupled or linked to a rotor of the generator 104. The engine 102 is controllable to operate at multiple speeds, such as an idle (e.g., no or minimal load speed) and a maximum speed (e.g., the maximum rated power of the engine 102). The engine speed may be increased and/or decreased based on the load. The generator 104 generates output power based on the mechanical input from the engine 102. In some examples, the generator 104 is implemented using a high-output alternator. Collectively, the engine 102 and the generator 104 provide mechanical power and/or electrical power to power subsystems. In some examples, the generator 104 may be omitted for systems that do not include electrical subsystems.

The example power system 100 includes power subsystems such as power conditioning circuitry 106, a hydraulic system 124 configured to output hydraulic power, and/or an air compressor 126 configured to output pneumatic power. The example hydraulic system 124 and the air compressor 126 may be powered by mechanical power from the engine 102 and/or by electrical power from the generator 104.

The example power conditioning circuitry 106 may include one or more power subsystems, such as a welding-type power supply 128 configured to output welding-type power, an auxiliary power supply 130 configured to output AC power and/or DC power, and/or a vehicle power subsystem 132 configured to convert electrical power to at least one of AC power or DC power to power at least one component of a vehicle 134 on which the engine-driven power system 100 is mounted.

In some examples, an external power supply subsystem 136 may be coupled (e.g., plugged in, hardwired, etc.) to the power conditioning circuitry 106 convert at least one of the AC power or the DC power from the auxiliary power supply 130 and/or the generator 104 to at least one of AC power or DC power, such as to power external devices that have different power requirements. The example external power supply subsystem 136 may also be communicatively coupled to the control circuitry 108 (e.g., wirelessly, via power line communication, via a communication cable, etc.) to enable the control circuitry 108 to control the demand and/or output of the external power supply subsystem 136.

The example power conditioning circuitry 106 includes a rectifier/preregulator circuit 138 that converts the AC power from the generator 104 to an intermediate voltage bus 140 having a bus voltage. The rectifier/preregulator circuit 138 controls the bus voltage to remain substantially constant. However, in the event that the total demand on the engine 102 exceeds the capacity of the engine 102, the rectifier/ preregulator circuit 138 may not receive sufficient power to maintain the bus voltage, and the bus voltage decreases proportionally to the excess demand on the engine 102. Each of the example welding-type power supply 128, auxiliary power supply 130, and/or vehicle power subsystem 132 receives power from the intermediate voltage bus 140.

The welding-type power supply 128 converts output power from the generator 104 (e.g., via the intermediate voltage bus 140) to welding-type power based on a commanded welding-type output. The welding-type power supply 128 provides current at a desired voltage to an electrode 110 and a workpiece 112 via output terminals 148 to perform a welding-type operation. The power conditioning circuitry 106 may include, for example, a switched mode power supply or an inverter fed from an intermediate voltage bus. Power conditioning circuitry may include a direct connection from a power circuit to the output (such as to the weld studs), and/or an indirect connection through power processing circuitry such as filters, converters, transformers, rectifiers, etc.

The auxiliary power supply 130 converts output power from the generator 104 (e.g., via the intermediate voltage bus 140) to AC power (e.g., 120 VAC, 240 VAC, 50 Hz, 60 Hz, etc.) and/or DC power (e.g., 12 VDC, 24 VDC, battery charging power, etc.). The auxiliary power supply 130 outputs one or more AC power outputs 142 (e.g., AC outlets or receptacles) and/or one or more DC power outputs 144 (e.g., DC outlets or receptacle). Similarly, the vehicle power subsystem 132 converts output power from the generator 104 (e.g., via the intermediate voltage bus 140) to AC power (e.g., 120 VAC, 240 VAC, 50 Hz, 60 Hz, etc.) and/or DC power (e.g., 12 VDC, 24 VDC, battery charging power, etc.), and outputs the power to the vehicle 134. In some examples, the vehicle 134 may be configured to communicate with the control circuitry 108 via a vehicle communication bus, a power system communication bus, a wireless network, and/or any other type of communication.

The power system 100 enables multiple ones of the power subsystems (e.g., the power conditioning circuitry 106, the hydraulic system 124, the air compressor 126, the welding-type power supply 128, the auxiliary power supply 130, the vehicle power subsystem 132, the external power supply subsystem 136, etc.) to be operated simultaneously.

A user interface 114 enables selection of a commanded power level or welding-type output, such as a current or voltage level to be used for welding-type operations, such as via one or more input device(s) 122. Example input devices may include selector switches, knobs, a touchscreen, buttons, a mouse, a keyboard or keypad, and/or any other type of input device. The user interface 114 additionally or alternatively enables selection of one or more speeds for the engine 102 (e.g., in RPM), such as an idle engine speed and/or engine speed under load.

The example control circuitry 108 may include digital and/or analog circuitry, discrete or integrated circuitry, microprocessors, digital signal processors (DSPs), field programmable gate arrays (FPGAs), and/or any other type of logic circuits. The example control circuitry 108 may be implemented using any combination of software, hardware, and/or firmware. The control circuitry 108 executes machine readable instructions 118 which may be stored on one or more machine readable storage device(s) 120 such as volatile and/or non-volatile memory, hard drives, solid state storage, and the like.

While the example power system 100 includes subsystems such as the power conditioning circuitry 106, the hydraulic system 124, the air compressor 126, the welding-type power supply 128, the auxiliary power supply 130, the vehicle power subsystem 132, the external power supply subsystem 136, the example power system 100 may be implemented as an engine-driven welding-type power supply that includes welding-type output and omits hydraulic output, pneumatic output, and one or more of the electrical outputs. For example, the power system 100 may be limited to the engine 102, the generator 104, the power conditioning circuitry 106, the control circuitry 108, and the user interface 114. In some examples, the power conditioning circuitry 106 may output only welding-type power. In some other examples, the power conditioning circuitry 106 may output one or more types of AC and/or DC, non-welding power (e.g., AC and/or DC auxiliary power, battery charging power, etc.).

The example control circuitry 108 automatically starts the engine in response to detecting a welding circuit scratch via the output terminals 148. The welding circuit scratch may take the form of the scratch start commonly used to initiate an arc when stick welding, which is typically performed while dragging the electrode 110 (e.g., a stick or SMAW electrode) over the workpiece 112. However, the welding circuit scratch may involve any type of welding electrode (e.g., a wire electrode, a stick electrode, a tungsten electrode, etc.) and/or a conductive element of the welding torch (e.g., a contact tip, a tungsten electrode, etc.). The examples below will be described with reference to a welding electrode-to-workpiece scratch. To detect the scratch, the example power system 100 includes a voltage source 150, such as a battery, power supply circuit, and/or other type of voltage source. When the engine 102 is off, the control circuitry 108 controls the voltage source 150 to apply a test voltage to the output terminals 148, such as by connecting the battery to the output terminals 148.

The power system 100 further includes a welding output sensor 146 configured to monitor the output (e.g., voltage, current, impedance, etc.) at the output terminals 148. In some examples, the welding output sensor 146 may measure the output at a different, but electrically equivalent, physical location than the output terminals 148. The welding output sensor 146 may include a voltage sensor that measures the voltage across the output terminals 148 and/or a current sensor configured to measure the current at the output terminals 148. The welding output sensor 146 collects samples of the voltage and/or current at the output terminals 148.

In some examples, the control circuitry 108 filters the collected samples, such as by determining a running average of the samples. The control circuitry 108 may then compare the filtered samples to a target range to determine whether a scratch has occurred by monitoring for an intermittent signal having at least a threshold duration. By filtering the samples, the control circuitry 108 filters out extended contacts (e.g., dropping the electrode onto the workpiece) and brief, low-count contacts (e.g., one or two taps between the electrode and the workpiece) from triggering an automatic engine start.

Figure 2:
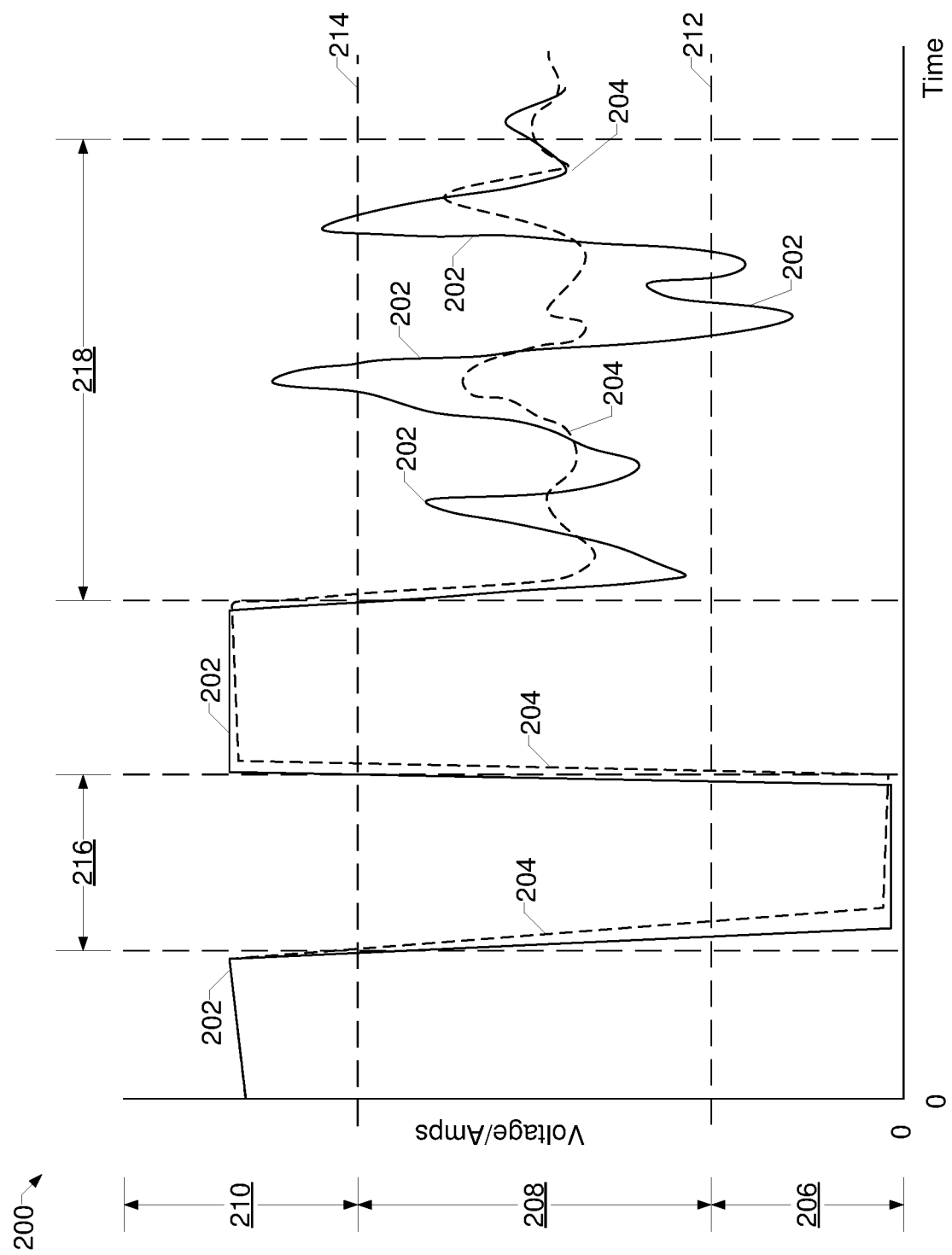
FIG. 2 illustrates a graph of example voltage or current samples obtained by the engine-driven power system of FIG. 1, while the engine is stopped, and which are used to automatically start the engine.

FIG. 2 illustrates a graph 200 of an example trace of voltage samples 202 obtained by the engine-driven power system 100 of FIG. 1, while the engine is stopped, and which are used to automatically start the engine. The voltage samples 202 are representative of consecutive voltage samples that may be captured by the control circuitry 108 of FIG. 1, such as via the welding output sensor 146 of FIG. 1. The graph 200 also includes a trace of filtered voltage samples 204, which is representative of a filtered signal generated by the control circuitry 108 based on the voltage samples 202.

The example graph 200 further illustrates example zones 206, 208, 210, including a short circuit zone 206, a target zone 208, and an open circuit zone 210. The short circuit zone 206 is below a lower voltage limit 212 and the open circuit zone 210 is above an upper voltage limit 214. The target zone 208 is between the voltage limits 212, 214. The limits 212, 214 may be based on the output voltage of the voltage source, such as a 12V battery or a power conditioning circuit having a different output voltage.

In the example of FIG. 2, the lower limit 212 of the target zone 208 is a voltage greater than a short circuit voltage and/or a current less than a short circuit current. In the example of FIG. 2, the upper limit 214 of the target zone 208 is a voltage less than an open circuit voltage (e.g., an output voltage of the voltage source 150) and/or a current greater than an open circuit current (e.g., zero). The short circuit voltage may be dependent on the type of electrode, the open circuit voltage, and/or other factors in the welding circuit. The short circuit current may be based on, for example, the upper limit on the current output of the voltage source 150. For example, using a 12V battery (having an approximately 14V nominal output voltage), the lower voltage limit 212 may be approximately 4 volts, and the upper voltage limit 214 may be approximately 10 volts. However, either or both of the limits 212, 214 may change based on the application. Alternatively, instead of measuring the voltage, the control circuitry 108 may define the zones 206, 208, 210 based on output current and associated current limits.

While the example limits 212, 214 are disclosed above with reference to voltage and current, the limits 212, 214 may be defined using other parameters, such as impedance.

The term "short circuit," as used with respect to the weld circuit (e.g., the electrode 110, the welding torch, and/or the workpiece 112), refers to closure of the weld circuit that does not involve an arc. For example, direct electrical contact between the electrode and the workpiece, or between the welding torch and the workpiece 112), are considered short circuits.

In an example of operation depicted by the graph 200, the power system 100 is off at a time 0 in an open circuit condition. During a time period 216, the operator inadvertently contacts the workpiece 112 with the electrode 110, which causes the measured voltage samples 202 to drop to the short circuit zone 206 and then return to the open circuit zone 210. The filtered samples 204 (e.g., a running average of the samples 202, averaging a subset of the samples, etc.) similarly drops to the short circuit zone 206 and then returns to the open circuit zone 210. Because the filtered samples 204 do not remain within the target zone 208 for at least a threshold duration during the time period 216, the control circuitry 108 does not detect a scratch.

During a later time period 218, the operator performs a scratch between the electrode 110 and the workpiece 112. The scratch action takes the form of a rapid succession of open circuits and short circuits, detected as successive increases and decreases in the voltage samples 202. While the voltage samples 202 may briefly go outside of the target zone 208, the filtered samples 204 remain within the target zone 208 for at least a threshold duration and/or at least a threshold number of filtered samples 204 and/or unfiltered samples 202, due to the filtering of the voltage samples 202.

In response to determining that at least a threshold number of the filtered samples 204 are within the target zone 208 and/or a threshold duration is reached, the control circuitry 108 detects the welding electrode-to-workpiece scratch. Additionally or alternatively, the control circuitry 108 may detect a scratch in response to determining that at least a threshold number of the filtered samples 204 are within the target zone 208 over a same time period that at least a threshold percentage of the filtered samples 204 are within the target zone 208.

In some other examples, instead of averaging or otherwise filtering the samples 202, the example control circuitry 108 may implement a non-filtering technique for detecting the scratch. For example, the control circuitry 108 may use a state machine or other logic to detect whether the voltage and/or current samples are indicative of a welding electrode-to-workpiece scratch.

As a result of detecting the scratch while the engine 102 is off, the control circuitry 108 starts the engine 102, which permits the operator to begin welding once the engine 102 has started and increased speed to provide the required power. By starting in response to detecting the scratch, the control circuitry 108 provides an easy method of remotely starting the engine 102 that is also significantly less prone to unintended engine starting than conventional power systems. Additionally, the control circuitry 108 enables flexibility in detecting the scratch by enabling manual and/or automatic adjustment of the range limits based on weld circuit variables (e.g., cable impedance) and/or operator scratch technique.

Figure 3:
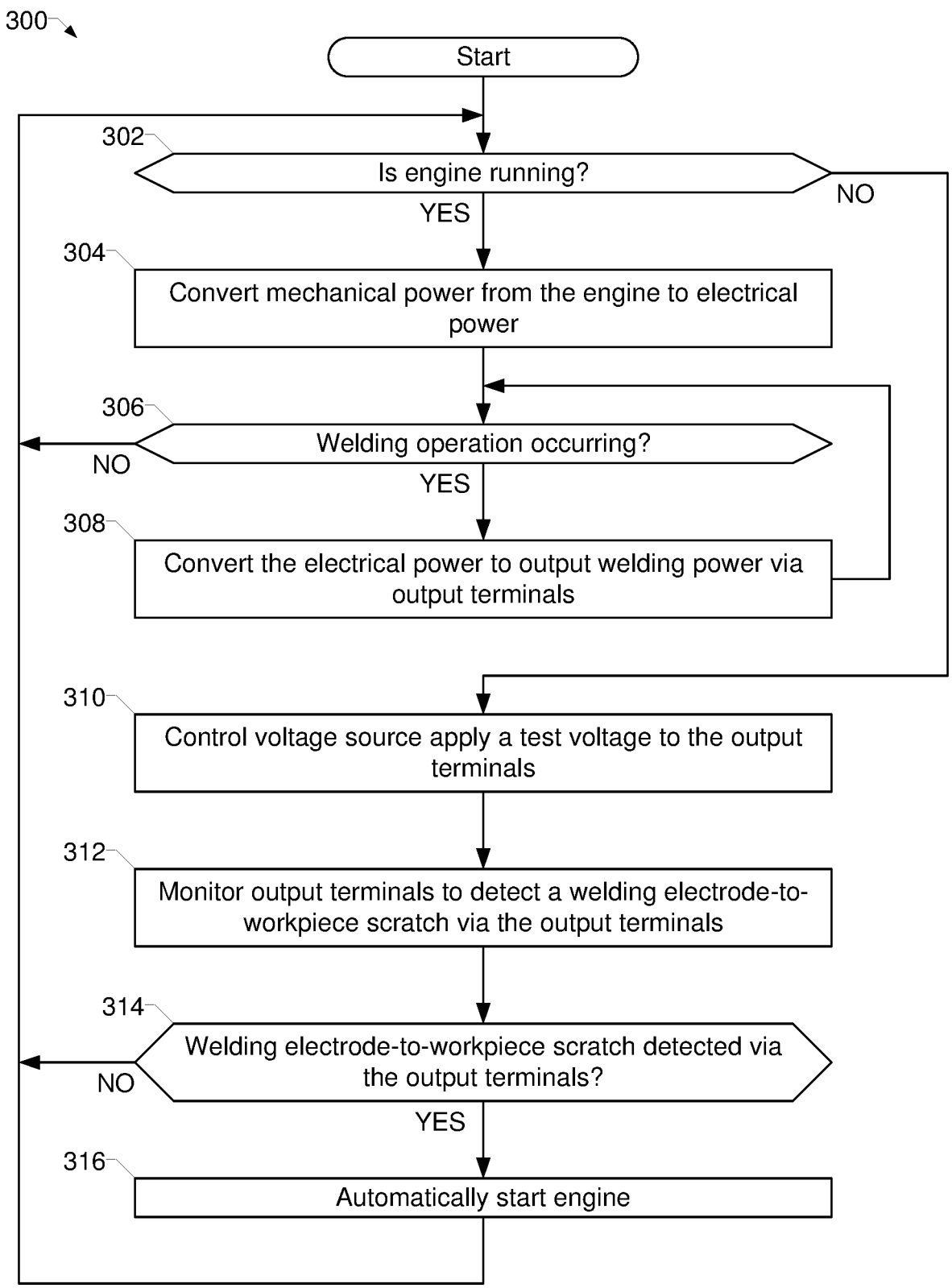
FIG. 3 is a flowchart representative of example machine readable instructions which may be executed to implement the control circuitry of FIG. 1 to automatically start the engine in response to detecting a welding electrode-to-workpiece scratch.

FIG. 3 is a flowchart representative of example machine readable instructions 300 which may be executed to implement the control circuitry 108 of FIG. 1 to automatically start the engine 102 in response to detecting a welding electrode-to-workpiece scratch.

At block 302, the control circuitry 108 determines whether the engine 102 is running. For example, the engine 102 may have been automatically stopped by the control circuitry 108 in response to idling for at least a threshold time. If the engine 102 is running (block 302), at block 304 the control circuitry 108 converts mechanical power from the engine 102 to electrical power.

At block 306, the control circuitry 108 determines whether a welding operation is occurring. For example, the control circuitry 108 may determine whether to start a welding operation and/or whether a welding operation is ongoing (e.g., based on output current and/or output voltage by the welding-type power supply 128). If a welding operation is occurring (block 306), at block 308 the control circuitry 108 controls the welding-type power supply 128 to convert the electrical power to output welding power via the output terminals 148. The control circuitry 108 then returns control to block 306.

If a welding operation is not occurring (block 306), the control circuitry 108 returns control to block 302.

If the engine 102 is not running (block 302), at block 310 the control circuitry 108 controls a voltage source (e.g., the voltage source 150 of FIG. 1) to apply a test voltage to the output terminals 148. For example, the control circuitry 108 may control a switching device to connect a battery to the output terminals 148 and/or control a voltage supply circuit to output the test voltage to the output terminals 148.

At block 312, the control circuitry 108 monitors the output terminals 148 (e.g., via the welding output sensor 146) to detect a welding electrode-to-workpiece scratch via the output terminals 148. For example, the control circuitry 108 may collect filtered samples (e.g., the filtered samples 204) by filtering a plurality of samples based on at least one of a voltage at the output terminals 148 or a current at the output terminals 148 and, in response to determining that at least a threshold number of the filtered samples 204 are within the target zone 208, detect the welding electrode-to-workpiece scratch.

At block 314, the control circuitry 108 determines whether a welding electrode-to-workpiece scratch has been detected (e.g., at block 312). If a scratch is detected (block 314), at block 316 the control circuitry 108 automatically starts the engine 102 (e.g., via an engine controller).

After starting the engine 102 (block 316), or if a scratch is not detected (block 314), the control circuitry 108 returns control to block 302.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be an processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An engine-driven welding-type power supply, comprising:
    an engine;
    a generator configured to convert mechanical power from the engine to electrical power;
    power conversion circuitry to convert the electrical power to welding power and to output the welding power via output terminals; and
    control circuitry configured to, while the engine is stopped, detect a welding circuit scratch by:
        controlling a voltage source to apply a test voltage to the output terminals;
        collecting filtered samples by filtering a plurality of samples based on at least one of a voltage at the output terminals or a current at the output terminals; and
        in response to determining that at least a threshold number of the filtered samples are within a predetermined range, detecting the welding circuit scratch;
    automatically start the engine in response to detecting the welding circuit scratch via the output terminals; and
    once the engine is started, permit a welding operation to begin using the output terminals.

2. The engine-driven welding-type power supply as defined in claim 1, wherein the control circuitry is configured to filter the plurality of samples to generate the filtered samples by averaging a subset of the plurality of samples.

3. The engine-driven welding-type power supply as defined in claim 1, wherein the control circuitry is configured to filter the plurality of samples to generate the filtered samples by determining a running average of the plurality of samples.

4. The engine-driven welding-type power supply as defined in claim 1, wherein a lower limit of the predetermined range comprises a voltage greater than a short circuit voltage.

5. The engine-driven welding-type power supply as defined in claim 1, wherein an upper limit of the predetermined range comprises a voltage that is less than an output voltage of the voltage source.

6. The engine-driven welding-type power supply as defined in claim 1, wherein a lower limit of the predetermined range comprises a current greater than zero.

7. The engine-driven welding-type power supply as defined in claim 1, wherein a lower limit of the predetermined range comprises a current less than a current limit of the voltage source.

8. The engine-driven welding-type power supply as defined in claim 1, wherein the control circuitry is configured to automatically start the engine in response determining that at least a threshold number of successive ones of the filtered samples are within the predetermined range.

9. The engine-driven welding-type power supply as defined in claim 1, wherein the control circuitry is configured to automatically start the engine in response to determining that at least a threshold number of the filtered samples are within the predetermined range over a same time period that at least a threshold percentage of the filtered samples are within the predetermined range.

10. The engine-driven welding-type power supply as defined in claim 1, wherein the control circuitry is configured to adjust at least one of the threshold number of the filtered samples or the predetermined range based on at least one prior detected welding electrode-to-workpiece scratch.

11. The engine-driven welding-type power supply as defined in claim 1, wherein the control circuitry is configured to not start the engine in response to the threshold number of the filtered samples being below the predetermined range.

12. The engine-driven welding-type power supply as defined in claim 1, wherein the control circuitry is configured to not start the engine in response to the threshold number of the filtered samples being above the predetermined range.

13. The engine-driven welding-type power supply as defined in claim 1, wherein the control circuitry is configured to detect the welding circuit scratch by detecting a plurality of short circuits interspersed with a plurality of open circuits via the output terminals for at least a threshold time period.

14. The engine-driven welding-type power supply as defined in claim 1, wherein the control circuitry is configured to detect the welding circuit scratch by:
   controlling a voltage source to apply a test voltage to the output terminals; and
   determining whether a plurality of samples are representative of the welding circuit scratch, the plurality of samples being based on at least one of a voltage at the output terminals or a current at the output terminals.

15. The engine-driven welding-type power supply as defined in claim 1, wherein the welding circuit scratch comprises at least one of a welding electrode-to-workpiece scratch or a welding torch-to-workpiece scratch.

16. A method to control an engine-driven welding-type power supply, the method comprising:
   while an engine is stopped, detect a welding circuit scratch via output terminals of a welding circuit by:
      controlling a voltage source to apply a test voltage to the output terminals;
      collecting filtered samples by filtering a plurality of samples based on at least one of a voltage at the output terminals or a current at the output terminals; and
      in response to determining that at least a threshold number of the filtered samples are within a predetermined range, detecting the welding circuit scratch;
   in response to detecting a welding circuit scratch via the output terminals, automatically starting the engine; and
   in response to initiation of a welding operation while the engine is on:
      converting mechanical power from the engine to electrical power; and
      converting the electrical power to welding power; and
      outputting the welding power via the output terminals.

17. The method as defined in claim 16, wherein the welding circuit scratch comprises at least one of a welding electrode-to-workpiece scratch or a welding torch-to-workpiece scratch.

* * * * *